United States Patent [19] [11] 4,352,520
Stiglmaier et al. [45] Oct. 5, 1982

[54] COMPOSITE OF A VEHICLE FRAME AND BODY PARTS

[75] Inventors: Manfred Stiglmaier, Gilching; Rudolf Hörmann, Dachau, both of Fed. Rep. of Germany

[73] Assignee: Maschinenfabrik Augsburg-Nurnberg Aktiengesellschaft, Munich, Fed. Rep. of Germany

[21] Appl. No.: 148,285

[22] Filed: May 9, 1980

Related U.S. Application Data

[63] Continuation-in-part of Ser. No. 966,021, Dec. 4, 1978, abandoned.

[30] Foreign Application Priority Data

Dec. 3, 1977 [DE] Fed. Rep. of Germany ....... 2753957

[51] Int. Cl.³ ............................................. B62D 25/20
[52] U.S. Cl. ..................................... 296/182; 52/403; 105/422
[58] Field of Search ................ 296/29, 35 R, 93, 203, 296/204, 205, 182; 105/422, 375; 52/403, 397, 177, 394, 393

[56] References Cited

U.S. PATENT DOCUMENTS 3,092,877 6/1963 Peritstein ............................ 52/403
3,578,375 5/1971 Firefrock ............................ 105/422
3,645,817 2/1972 Walker et al. ...................... 296/93
3,659,896 5/1972 Smith et al. ........................ 296/93
3,766,698 10/1973 Dallen ................................. 52/403
3,785,104 1/1974 Dallen ................................. 52/403
3,909,059 9/1975 Benninger et al. ................ 296/102
3,968,608 7/1976 Swango .............................. 52/403

FOREIGN PATENT DOCUMENTS 2522477 12/1975 Fed. Rep. of Germany ...... 296/182

Primary Examiner—Joseph F. Peters, Jr.
Assistant Examiner—Ross Weaver
Attorney, Agent, or Firm—Antonelli, Terry & Wands

[57] ABSTRACT

A motor vehicle construction which includes at least one vehicle body part such as a floor panel mounted on a vehicle frame by an insert. The body part is only affixed to the vehicle frame so that a connection between the vehicle frame and body part exists by way of the insert. The construction is assembled by applying a layer of a mixture consisting essentially of an adhesive material and an elastic filler to the attaching surface of the frame. The body part is placed upon the layer of the mixture and, if necessary, joints between adjacent body parts are filled with the mixture. The mixture is hardened to form the insert.

14 Claims, 6 Drawing Figures

COMPOSITE OF A VEHICLE FRAME AND BODY PARTS

This application is a continuation-in-part application of U.S. application Ser. No. 966,021, filed Dec. 4, 1978 now abandoned.

The present invention relates to motor vehicles and, more particularly, to a composite of vehicle parts and a method of assembling such composite of vehicle parts, wherein the vehicle parts include a vehicle frame and at least one body part such as, for example, a floor or bottom panel of a vehicle, with outer rims or peripheral edges of the body parts being surrounded by a profile member constructed of an elastic material such as, for example, rubber or a similar material.

It has been found that a floor, especially a floor of a bus, acts as a sound-reflecting diaphragm radiating considerable sonic energy from the vehicle frame into the passenger compartment of the bus. The predominant sonic vibrations of the vehicle frame range between 300 and 4,000 Hz. The source of such vibrations is vibration-exciting agents supported at the vehicle frame such as, for example, the driven vehicle axle and associated transmissions as well as the drive train arranged between the vehicle engine and the rear axle. The vibrations are introduced into the vehicle frame by axle mountings at the vehicle frame as well as by, for example, pipe lines, controllers, tanks, and other units which are more or less directly attached to the vehicle frame.

In passenger vehicles such as buses, it has been proposed to directly attach the floor or bottom panels to the vehicle frame by way of fasteners such as screws disposed along the peripheral edges of the floor panels with the screws being formed as sheet metal screws which penetrate the floor panels.

A disadvantage of the aforementioned proposed arrangement resides in the fact that the direct fastening of the floor panels to the vehicle frame by the fasteners creates a sound and/or vibration bridge between the vehicle frame and the floor panels which transmits annoying sounds and/or vibrations into the passenger cell or compartment of the bus.

To minimize the transmission of sounds and/or vibrations from the vehicle frame to the floor panels and hence to the passenger cell or compartment of a bus, German Pat. No. 518,997 proposes interposing a plastic intermediate layer of a thickness of about 1-2 mm which is to serve as a sealing material between the metallic vehicle frame and the floor panels which are ordinarly made of wood.

Since vibrations in the range of 300-4,000 Hz have a particular annoying effect on humans, other attempts have been made to reduce the sound reflection of the floor panels, especially in buses, by, for example, attaching additional masses to the floor panels for the purpose of detuning the vibration system. A disadvantage of such a proposal resides in the fact that while a reduction in the sound reflection may be realized, the proposed solution is, on the one hand, expensive and, on the other hand, leads only partially to a reduction of the sound reflection.

The aim underlying the present invention essentially resides in providing a method of assembling vehicle body parts and an assembly of vehicle parts, especially floor panels whereby such panels are mounted to a vehicle frame so that a sound and/or vibration reflection from the body parts and/or floor panels is extensively suppressed.

According to advantageous features of the present invention, at least one body part and an insert, fashioned as a profile member, is provided, with the body part only being affixed to the profile member and the profile member only being affixed to the vehicle frame so that any connection which exists between the vehicle frame and body part exists solely by way of the profile member.

By virtue of a mounting of the body part and profile member in accordance with the present invention, there is no physical sound bridge between the metallic vehicle frame and the body parts and/or floor panels of the vehicle so that a transmission of sonic energy from the vehicle frame to the body parts and/or floor panels and thus sound reflection are considerably restricted.

Moreover, a composite of the body part and/or floor panel and profile member according to the present invention, not only affords advantages in the field of sound attenuation, but at the same time results in improved corrosion protection of the outer peripheral edges of the body parts and/or floor panels since the profile member encases such edges so that there is no exposure to mechanical and/or chemical attacks.

Additionally, according to further advantageous features of the present invention, an assembly of body parts and/or floor panels is generally simplified since it is no longer necessary to provide the body parts and/or floor panels proper with passage holes for the mounting thereof to the vehicle frame and assembly tolerances can be maintained higher.

According to further advantageous features of the present invention, suitable mounting means for the connection of the profile member to the vehicle frame may be fashioned as nails or clamps adapted to be received in mounting supports of the profile member. For ease of production, the clamps or retainers may be formed during the manufacture of the profile member so that the assembly of the body parts and/or floor panels may be further simplified. However, it is also possible to cement the profile member to the vehicle frame.

In accordance with further features of the present invention, the profile member is formed of a selected material and is provided with a geometric configuration adapted to the body part and/or floor panel so that the composite of the body part and profile member have a natural frequency below 300 Hz, whereby a resonance of the composite and an increased sound reflection can only be in a frequency range no longer felt as being troublesome or annoying by vehicle passengers. Advantageously, the profile member adaptation is such that the natural frequency of the composite of the body part and profile member lies between 130 and 180 Hz.

To obtain the above-noted low natural frequency, according to the present invention, the profile member is fashioned of a solid rubber having a Shore hardness of about 45. Moveover, the profile member may either have a simpe T-shape or double T-shape cross-sectional configuration. With a simple T-shaped cross section, the T-crossbar rests flush on the vehicle frame; whereas, with a double T-shaped configuration, the two T-crossbars extend around an edge of the associated body part with one of the T-crossbars resting flush on the vehicle frame.

Additionally, chambers or passages extending over an entire length of the profile member may be provided with the configuration of the chambers or passages being a factor in determining the natural frequency of the composite of the body part and profile member.

To facilitate mounting of the composite, according to yet another feature of the present invention, passage bores or the like may be provided in the profile member for receiving mounting elements; however, as noted above, if desired, the profile member may be cemented directly to the vehicle frame.

In accordance with still further features of the present invention, the insert may consist essentially of a mixture of an adhesive and an elastic filler.

In accordance with the method of assembly of the present invention, the assembly of a vehicle frame and body parts, especially floor panels, is effected by applying a mixture of an adhesive and an elastic filler on the surface provided for attaching the body parts, after which the body parts are placed on the layer of adhesive and elastic filler and joints between the body parts are filled with the mixture.

By virtue of the method of assembly of the present invention, it is no longer necessary to proceed by first applying an adhesive layer to the vehicle frame, then sticking the insert on, and finally sticking the body parts to the insert but rather a plastic layer, which at the same time forms the insert material and adhesive merely has to be applied to the vehicle frame after which the body parts are placed on the layer.

In accordance with further advantageous features of the method of the present invention, the thickness of the layer may be matched within broad limits to the material properties of the body parts, which is of particular advantage in the production of the desired low natural frequency of the manufactured body part and/or the insert subassembly. More particularly, the layer thickness of the mixture is made dependent upon the material properties of the body parts such that the natural frequency of the body parts and hardened insert subassembly is lower than a natural frequency of the frame of the vehicle.

Accordingly, it is an object of the present invention to provide a vehicle assembly of body parts and a method of assembling such body parts which avoids, by a simple means, shortcomings and disadvantages encountered in the prior art.

Another object of the present invention resides in providing a vehicle construction which is simple in construction so that a mounting is realized which minimizes manufacturing expenses.

A further object of the present invention resides in a vehicle construction which provides a mounting arrangement which is readily utilizable for large-scale mass production.

Yet another object of the present invention resides in providing a vehicle construction wherein annoying vibrations and/or sound reflections from vehicle parts are minimized if not avoided.

A still further object of the present invention resides in providing a vehicle construction wherein vehicle body parts are protected from mechanical and/or chemical attacks.

These and other objects, features, and advantages of the present invention will become more apparent from the following description when taken in connection with the accompanying drawings, which show for the purpose of illustration only, several embodiments in accordance with the present invention, and wherein.

Figure 1:
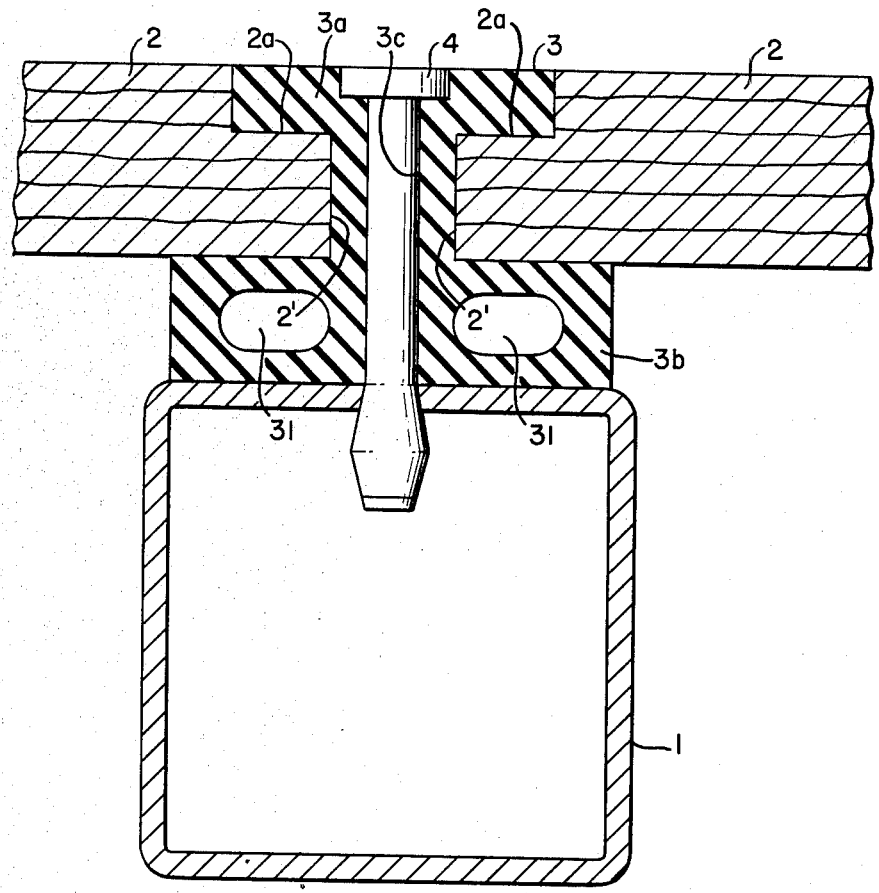
FIG. 1 is a partial cross-sectional view of a vehicle construction in accordance with the present invention with floor panels of a vehicle being mounted to a frame support of a bus.

Referring now to the drawings wherein like reference numerals are used throughout the various views to designate like parts and, more particularly, to FIG. 1, according to this figure, a frame support 1 forming a portion of a lattice-type floor frame, not illustrated in detail, of a bus is constructed from, for example, a square steel pipe. Floor panels 2 formed in the illustrated embodiment by wooden panels, are supported on the lattice-type floor frame. Rather than provide a direct mounting or attachment, the floor panels 2 are secured to the frame support 1 by encasing the floor panels 2 along outer peripheral edges 2' by an elastic profile member 3 of, for example, rubber, having a double T-shaped cross-sectional configuration.

As shown in FIG. 1, the upper surface of adjacent floor panels is provided with a recess or notch 2a for accommodating an upper T-shaped crossbar 3a of the profile member 3 while an upper surface of a lower T-shaped crossbar 3b rests flush against a lower surface of the adjacent floor panels 2.

The double T-shaped profile member 3 is attached to the frame support 1 and to further supports of the lattice-type floor frame (not shown) by a suitable fastener 4 such as, for example, plastic nails which are under an expansion effect. The fasteners 4 extend through passage bores 3c of the double T-shaped profile member 3 with the passage bores 3c being uniformly distributed over an entire length of the profile member 3.

To obtain a maximally extensive decoupling or separation of the floor panels 2 from the vibration exciting floor frame and frame support 1, the profile member 3 is constructed so that the resonant frequency of the composite of floor panels 2 and profile members 3 is in the range of between 130 and 180 Hz. For this purpose, the T-crossbar 3b of the profile member 3 resting on the frame support 1 is provided in its cross section with chambers 31 which extend over an entire length of the profile member 3. In the illustrated embodiment of FIG. 1, the chambers 31 have an oval configuration. Due to the presence and configuration of the chambers 31 as well as to a low Shore hardness of the material of the profile member of about 45, the profile member 3 is maintained soft in a desired manner so as to prevent a transmission of sound and/or vibration through solid materials from the frame support 1 to the floor panels 2 and passenger compartment of the vehicle.

Figure 2:
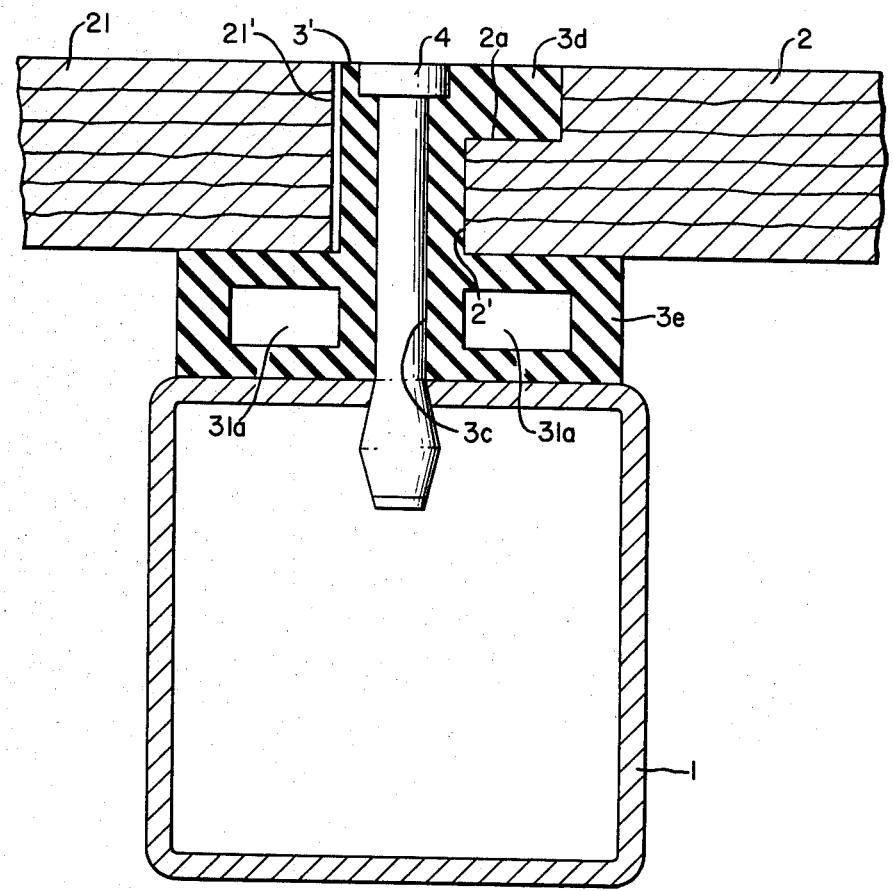
FIG. 2 is a partial cross-sectional view of another embodiment of a vehicle construction in accordance with the present invention.

FIG. 2 provides an example of a vehicle construction wherein one of the body parts is adapted to be removed to, for example, provide access to other vehicle components. For this purpose, a profile member 3', having an essentially T-shaped cross-sectional configuration, is provided and disposed between adjacent edges 2' and 21' of a floor panel 2 and a removable panel 21. A T-crossbar 3e of the profile member 3' is arranged between a lower surface of the floor panel 2 and adjacent removable panel 21 and frame support 1. The profile member 3' is provided with an angled portion 3d adapted to be received in a notch or recess 2a of the floor panel 2. The profile member 3 is formed of a rubber material as with the embodiment of FIG. 1 and includes chambers 31a extending over an entire length of the profile member 3' with the chambers 31a having a rectangular cross-sectional configuration.

As shown in FIG. 2, by virtue of the omission of the T-crossbar projecting on the left side of such figure, the profile member 3' forms a continuous, vertical end strip on the left side.

Figure 3:
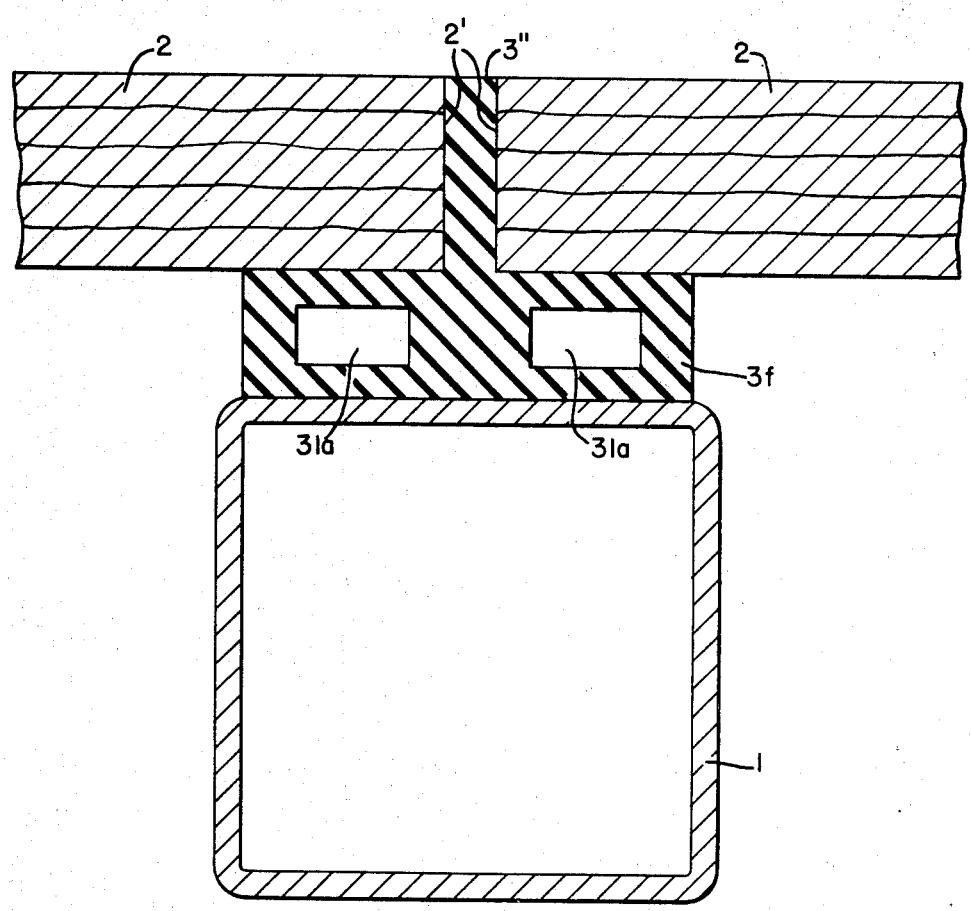
FIG. 3 is a partial cross-sectional view of a further embodiment of a vehicle construction in accordance with the present invention with a connection between the vehicle body part and vehicle frame being attained by a cementing or gluing.

FIG. 3 provides an example of a profile member 3' having a simple T-shaped cross-sectional configuration with a T-crossbar 3f of the profile member 3'' being arranged between a lower surface of adjacent floor panels 2 and frame support 1. As with the abovedescribed embodiments, the profile member 3'' is formed of a rubber material and is provided with chambers 31a which extend over the entire length of the profile member 3''. The T-crossbar 3f of the profile member 3'' is cemented or glued to the frame support 1 and the floor panels 2 are simply inserted in the frames formed by the profile members 3''. The floor panels, if desired, can likewise be secured to the profile member 3'' by cementing or gluing.

Figure 4A:
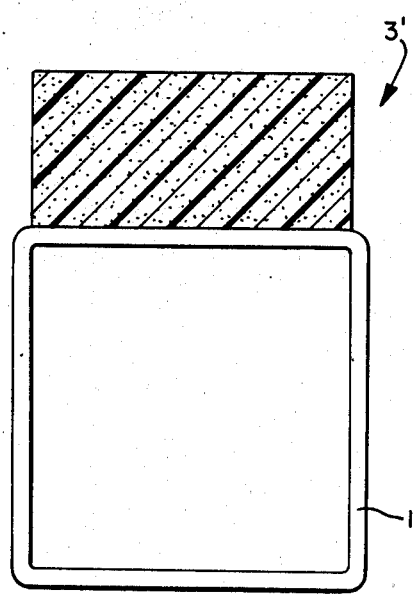
FIGS. 4a, 4b, and 4c are partial cross-sectional views illustrating the method of assembly in accordance with the present invention.
Figure 4B:
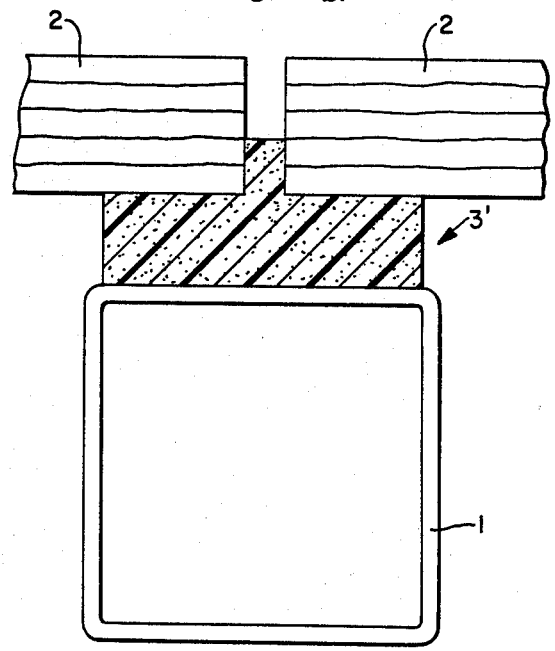
Figure 4C:
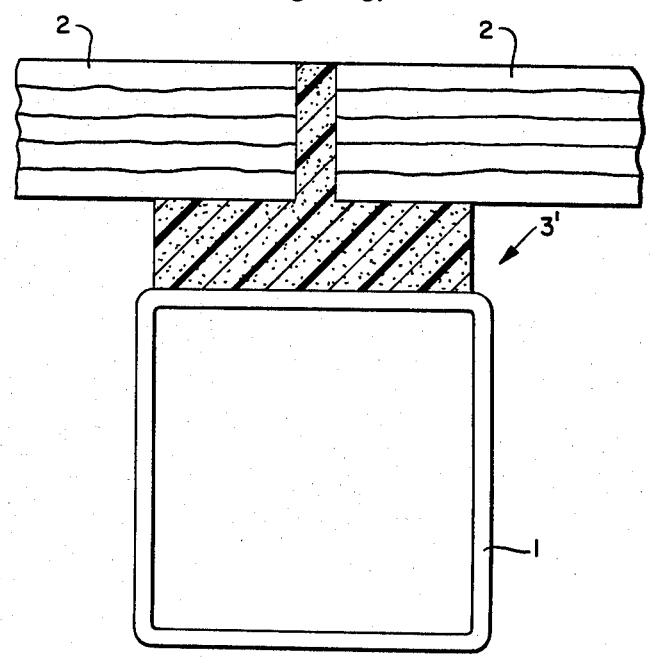

FIGS. 4a–4c provide an example of the method of assembly in accordance with the present invention. More particularly, as shown in FIG. 4a, a viscous mixture generally designated by the reference numeral 3 of an epoxy-resin adhesive and an elastic filler such as shredded rubber is applied in a desired layer thickness to an upper surface of a vehicle part such as, for example, the floor frame 1. As shown in FIG. 4b, floor panels 2 are then placed by their edges on the still plastic material whereby the mixture 3 forms itself around the edge contours of the floor panels 2. If, for example, the mixture 3 of plastic material does not spontaneously rise into the joints between the two floor panels 2 (FIG. 4b), as shown in FIG. 4c, more material is added to fill up the joint. The mixture of material forming the insert between the joints is then left to set or harden in situ which may, for example, be accomplished at a temperature somewhat above a normal temperature.

The proportion between the amount of elastic filler, i.e., shredded rubber, and the amount of epoxy resin adhesive determines the softness of the resulting insert between the floor panels 2. For example, the more elastic filler the softer the insert and the lower the natural frequency of the subassembly formed by the floor panels 2, insert 3 and frame 1.

Additionally, the thickness of the layer of material forming the insert to be produced may, in accordance with the method of the present invention, be selected within limits whereby a considerable layer thickness brings about a sharp decrease in the natural frequency of the subassembly.

While FIGS. 4a–4c illustrate a somewhat flush or butt joint between the floor panels 2, as can readily be appreciated, the method of the prresent invention may also be employed to form inserts such as, for example, illustrated in FIGS. 1 and 2.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A vehicle construction which includes at least two vehicle body parts, and means for mounting the vehicle body parts at a vehicle frame, characterized in that the at least two vehicle body parts are floor panels, the mounting means includes a vibration damping insert of a viscous material adapted to be hardened in situ, the floor panels are only attached to the insert and the insert is only attached to the vehicle frame the vibration damping insert has a natural frequency which is lower than a natural frequency of the vehicle frame, the vibration damping insert has a substantially T-shaped cross-sectional configuration and is disposed between adjacent edges of the floor panels, a T-crossbar of the vibration damping insert is adapted to rest flush on the vehicle frame, and in that the material of the vibration damping insert consists essentially of a mixture of an adhesive material and an elastic filler.

2. A vehicle construction according to claim 1, characterized in that a composite of the floor panel and insert has a natural frequency of between 130 Hz and 180 Hz.

3. A vehicle construction according to claims 1 or 2, characterized in that the elastic filler is rubber material having a Shore hardness of about 45.

4. A vehicle construction according to claim 1 or 2, characterized in that at least one chamber extending through an entire length of the insert is provided in the T-crossbar adapted to rest flush on the vehicle frame.

5. A vehicle construction according to claim 4, characterized in that the at least one chamber has an oval cross-sectional configuration.

6. A vehicle construction according to claim 4, characterized in that the at least one chamber has a rectangular cross-sectional configuration.

7. A vehicle construction according to claim 1, characterized in that the adhesive material is an epoxy resin adhesive.

8. A vehicle construction according to claim 7, characterized in that the elastic filler is a shredded rubber.

9. A vehicle construction which includes at least two vehicle body parts, means for mounting the vehicle body parts at a vehicle frame, characterized in that the at least two vehicle body parts are floor panels, mounting means includes a vibration damping insert of a viscous material adapted to be hardened in situ, the floor panels are only attached to the insert and the insert is only attached to the vehicle frame, the vibration damping insert has a natural frequency which is lower than a natural frequency of the vehicle frame, and in that the material of the vibration damping inserts consists essentially of a mixture of adhesive material and an elastic filler.

10. A vehicle construction according to claim 9, characterized in that the adhesive material is an epoxy resin adhesive.

11. A method of assembling vehicle floor panels to a vehicle frame, the method comprising the steps of:
applying a layer of a mixture consisting essentially of an adhesive material and an elastic filler on a surface of the vehicle frame to which the floor panels are to be attached;
placing the floor panels on the layer of the mixture;
filling joints between adjacent floor panels with the misture; and hardening the mixture so as to form an insert between the floor panels and the vehicle frame such that the floor panels are only attached to the insert and the insert is only attached to the vehicle frame.

12. A method according to claim 11, wherein the layer of the mixture has a thickness which depends upon material properties of the floor panels such that a natural frequency of a composite of the body parts and the hardened insert is lower than a natural frequency of the vehicle frame.

13. A method according to one of claims 11 or 12, wherein the adhesive material is an epoxy resin adhesive.

14. A method according to claim 13, wherein the elastic filler is a shredded rubber.

* * * * *